(12) United States Patent
Vogts

(10) Patent No.: US 9,043,948 B2
(45) Date of Patent: Jun. 2, 2015

(54) AUXILIARY CLOSING WHEEL FOR SEEDER

(71) Applicant: Mark Vogts, Moundridge, KS (US)

(72) Inventor: Mark Vogts, Moundridge, KS (US)

(*) Notice: Subject to any disclaimer, the term of this patent is extended or adjusted under 35 U.S.C. 154(b) by 49 days.

(21) Appl. No.: 13/732,836

(22) Filed: Jan. 2, 2013

(65) Prior Publication Data

US 2014/0182497 A1 Jul. 3, 2014

(51) Int. Cl.
*A01C 5/06* (2006.01)
(52) U.S. Cl.
CPC ..................................... *A01C 5/066* (2013.01)
(58) Field of Classification Search
CPC ........ A01C 5/066; A01C 5/068; A01C 5/064; A01C 5/062; A01C 5/06; A01C 5/00
USPC ............................................. 111/190–196, 14
See application file for complete search history.

(56) References Cited

U.S. PATENT DOCUMENTS

2012/0325133 A1* 12/2012 Whalen et al. ................ 111/193

* cited by examiner

*Primary Examiner* — Christopher J Novosad
(74) *Attorney, Agent, or Firm* — Dale J. Ream

(57) ABSTRACT

The present invention includes an auxiliary closing wheel for use with an agricultural seeding implement of a type of having a factory closing wheel rotatably coupled to a mounting arm with a rod. The auxiliary closing wheel includes a plate member rotatably coupled to the rod to which the factory closing wheel is coupled. The auxiliary closing wheel has a generally planar and annular configuration. The plate member includes a peripheral edge having a plurality of spiked teeth extending away therefrom. The plate member includes an inner surface defining a flange configured to mate with a recessed area of the factory closing wheel such that both wheels thereafter move unitarily. The plate member includes a diameter greater than a diameter of the factory closing wheel such that the spiked teeth will contact a ground surface in use instead of the factory closing wheel.

2 Claims, 5 Drawing Sheets

AUXILIARY CLOSING WHEEL FOR SEEDER

BACKGROUND OF THE INVENTION

This invention relates generally to agricultural equipment and accessories and, more particularly, to an auxiliary closing wheel for use with an agricultural crop seeding implement so as to more effectively sow seed in both conventional tillage and heavy residue non-tillage seeding conditions.

A seeding implement, also referred to as a seeder or planter, is a piece of agricultural equipment pulled behind a tractor that forms a seed slot on the ground, deposits crop seeds into the seed slot and, in some models, covers up the seed using one or more "closing wheels." In full tillage seeding—meaning the soil has been tilled to reduce residue from prior crops or from hard soil—the factory wheel works well as there is no residue for the wheel to ride or bounce over and, because the soil has been tilled, it is generally soft and the seed slot closes nicely. However in a no till situation where there is heavy crop residue on the soil surface and the soil is relatively stiff, the factory wheel may bounce over residue and does not have enough weight to properly close the seed slot. Obviously, if the seed slot is not closed adequately, the overall seeding operation may not produce a desired stand.

Various aftermarket devices have attempted to remedy the problem of seeding in no-till conditions. Specifically, spiked closing wheels have been made to replace the factory closing wheels that, in use, push through residue and break up hard soil. Although assumably effective for its intended purpose regarding no-till conditions, the spike wheels penetrate too deeply in conventional till conditions and disturb newly placed seeds. As a result, farmers may have to interchange factory closing wheels and spiked closing wheels regularly.

Therefore, it would be desirable to have an auxiliary closing wheel having a spiked configuration that may be mounted to a factory closing wheel so as to efficiently manage seeding in all soil conditions. The additional weight of the auxiliary closing wheel will push its spiked teeth through residue and hardened soil in no-till conditions while the factory closing wheel will provide depth control to the spiked auxiliary closing wheel in till conditions.

SUMMARY OF THE INVENTION

The present invention includes an auxiliary closing wheel for use with an agricultural seeding implement of a type of having a factory closing wheel rotatably coupled to a mounting arm with a rod. The auxiliary closing wheel includes a plate member rotatably coupled to the rod to which the factory closing wheel is coupled. The auxiliary closing wheel has a generally planar and annular configuration. The plate member includes a peripheral edge having a plurality of spiked teeth extending away therefrom. The plate member includes an inner surface defining a flange configured to mate with a recessed area of the factory closing wheel such that both wheels thereafter move unitarily. The plate member includes a diameter greater than a diameter of the factory closing wheel such that the spiked teeth will contact a ground surface in use instead of the factory closing wheel.

Therefore, a general object of this invention is to provide an auxiliary closing wheel for attachment to a factory closing wheel of an agriculture seeding implement that improves seeding in heavy residue and no-till conditions.

Another object of this invention is to provide an auxiliary closing wheel, as aforesaid, having a spiked teeth at a peripheral edge configured to push through residue.

Still another object of this invention is to provide an auxiliary closing wheel, as aforesaid, that may be coupled to the same rod that couples a factory closing wheel to a mounting arm of a seeding implement so as to form a combination closing wheel assembly.

Yet another object of this invention is to provide an auxiliary closing wheel, as aforesaid, that is easy to install on a seeding implement and that may remain attached for use in all soil conditions.

A further object of this invention is to provide an auxiliary closing wheel, as aforesaid, that saves a farmer both time and money by supplementing rather than replacing factory parts already purchased with a seeding implement.

Other objects and advantages of the present invention will become apparent from the following description taken in connection with the accompanying drawings, wherein is set forth by way of illustration and example, embodiments of this invention.

DESCRIPTION OF THE PREFERRED EMBODIMENT

Figure 1:
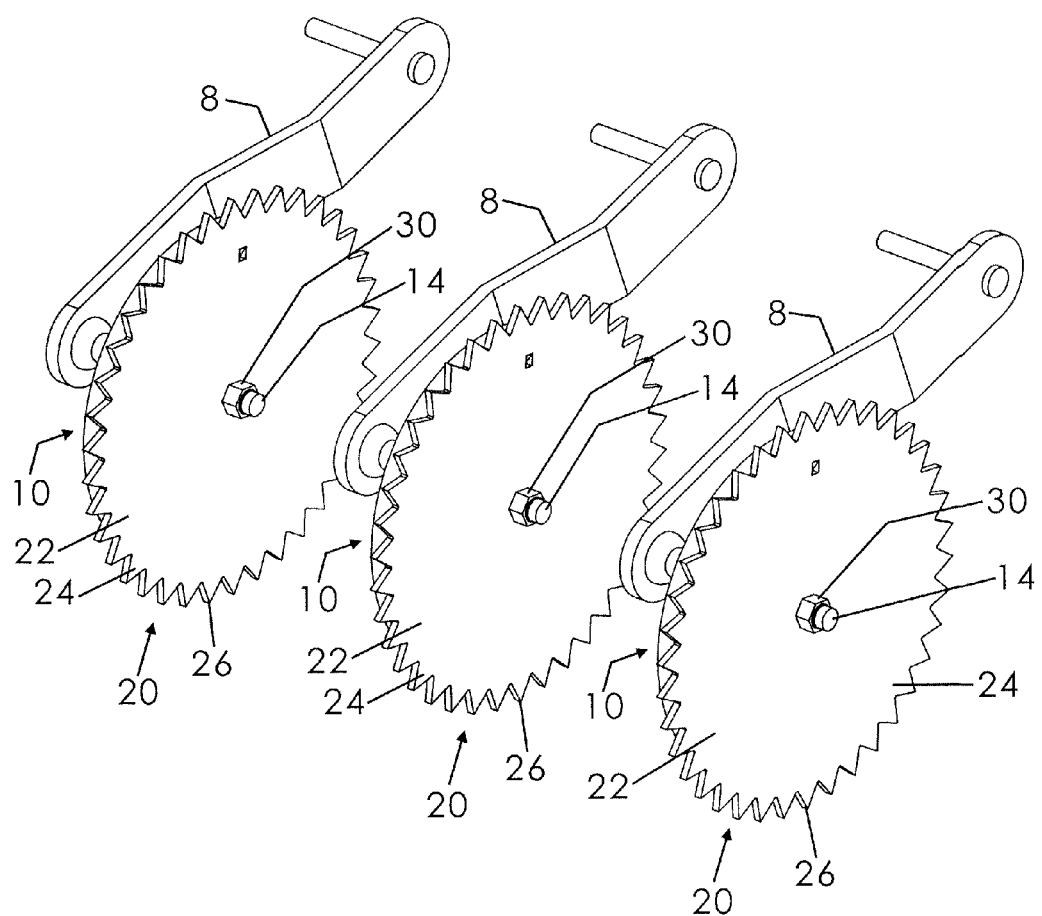
FIG. 1 is a perspective view of a plurality of auxiliary closing wheels in use with a plurality of factory closing wheel coupled to respective mounting arms of a seeding implement according to a preferred embodiment of the present invention.

An auxiliary closing wheel for an agricultural seeding implement will now be described with reference to FIGS. 1 to 5 of the accompanying drawings. The auxiliary closing wheel 20 includes a plate member 22, spiked teeth 26 along a peripheral edge 24, and a flange 32 configured to mate with a factory closing wheel 10 on the seeding apparatus.

The auxiliary closing wheel 20 is a best understood with a preliminary description of the type of agricultural seeding implement for which it is designed to be used. A seeding implement, also referred to as a planter, is a piece of agricultural equipment that deposits crop seeds onto the surface of a field and, in some models, covers up the seed using one or more "closing wheels." The seeder may include multiple reservoirs or bins configured to contain quantities of crop seed, multiple disc seed slot openers, devices for metering output of seed from the reservoirs into the seed slots as a tractor pulls the seeder through a field, and a plurality of closing wheels configured to cover deposited seed with dirt. These closing wheels will be referred to hereafter as "factory closing wheels" for clarity over the auxiliary closing wheel 20 of the present invention.

Figure 2:
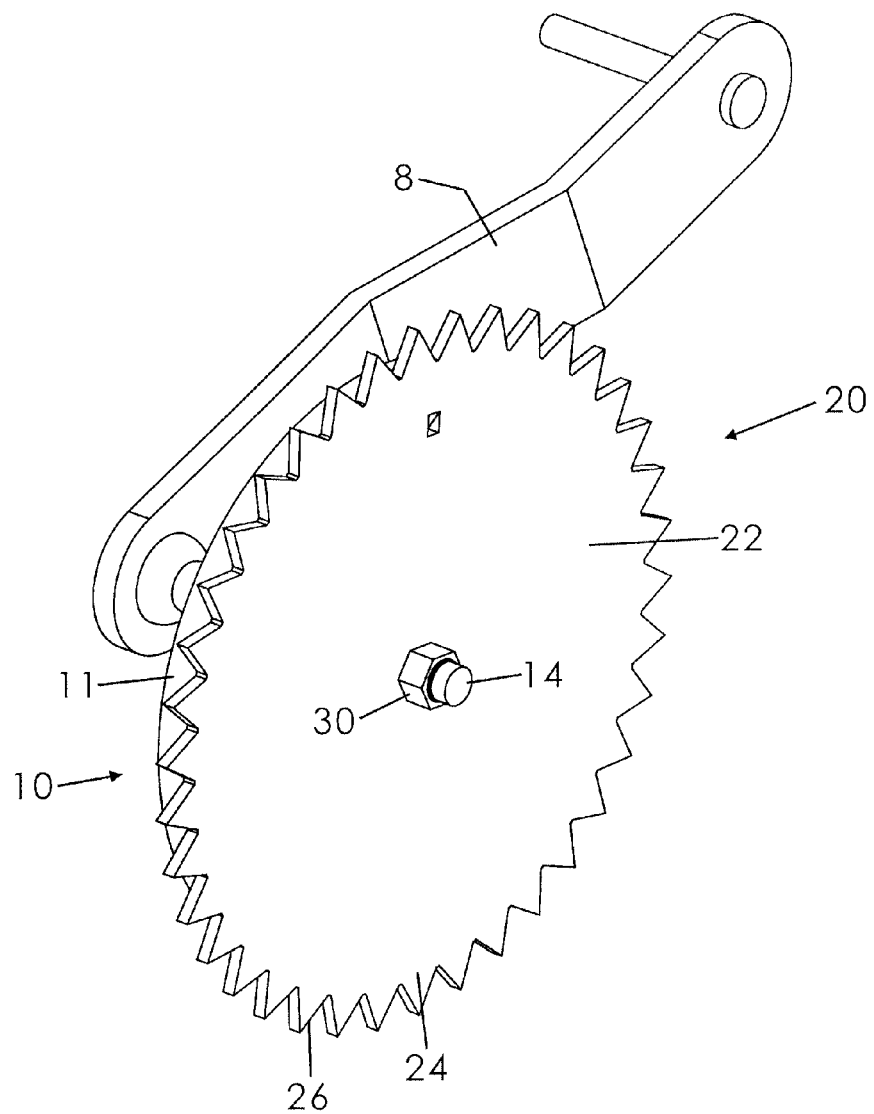
FIG. 2 is a perspective view of a single auxiliary closing wheel in use with a single factory closing wheel.
Figure 3:
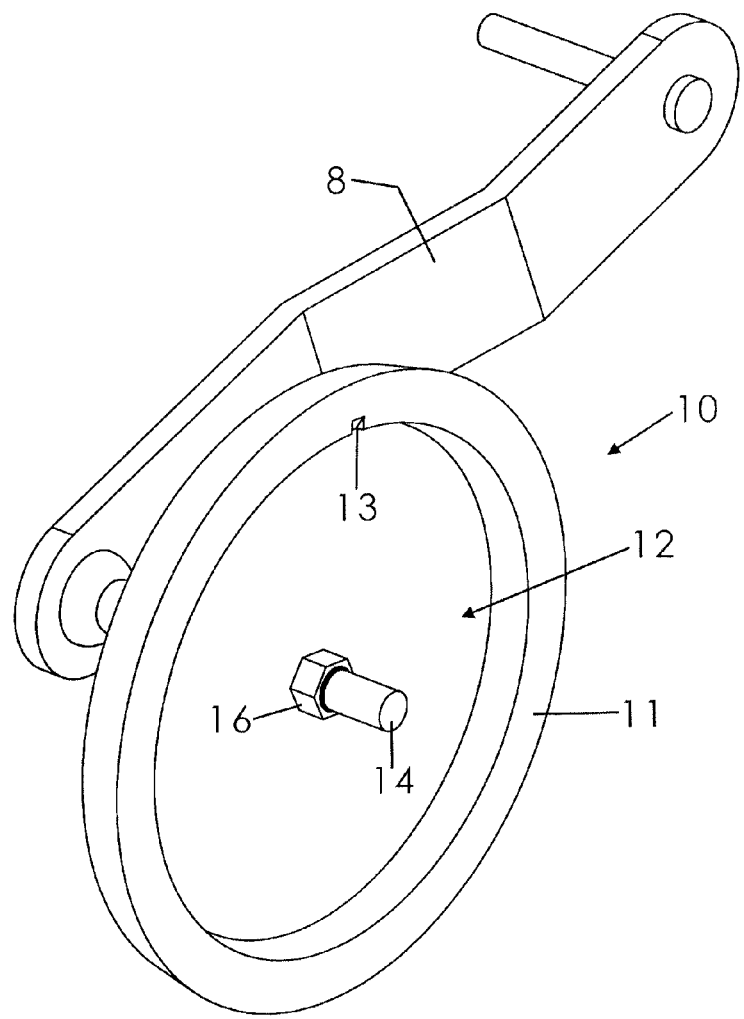
FIG. 3 is a perspective view as in FIG. 2 with an auxiliary closing wheel removed from a factory closing wheel.
Figure 4:
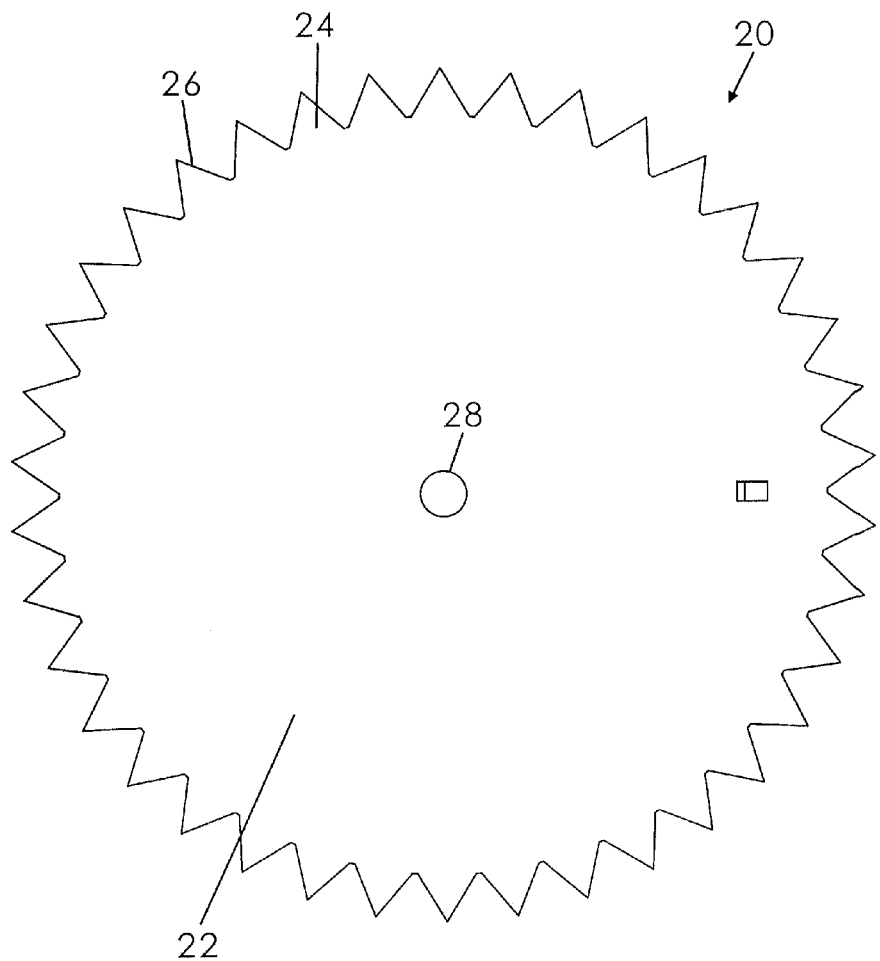
FIG. 4 is a front view of an auxiliary closing wheel removed from a mounting arm and respective factory closing wheel.

Each factory closing wheel 10 is rotatably coupled to a mounting arm 8 of the seeding implement with a rod 14. More particularly, the rod 14 may be rotatably coupled to the mounting arm 8 such as with a bearing. The factory closing wheel 10 is selectively coupled to the rod 14, such as with a fastener, as will be described later so that the factory closing wheel 10 is "operatively" rotatable relative to the mounting arm 8. It is understood that a typical seeding implement may have multiple mounting arms 8 and multiple factory closing wheels 10. The rod 14 may have a threaded configuration, such as a bolt. The factory closing wheel 10 may be prevented from sliding off of the rod 14 by a first fastener 16 such as a nut threadably received onto the rod 14 (FIG. 3). Each factory closing wheel 14 may include a main plate and a wall 11 about its peripheral edge that extends outwardly from the main plate. The outwardly extending wall 11 defines a recessed area 12 (FIG. 2). The outwardly extending wall 11 may also be referred to as a hub or a boss.

The auxiliary closing wheel 20 includes a main plate member 22 having a generally planar configuration. The plate member 22 also includes a generally circular configuration having an annular peripheral edge 24. The peripheral edge 24 of the plate member 22 includes or defines a plurality of teeth 26 having sharp or spiked configurations. The spiked teeth 26 extend outwardly from the peripheral edge 24 of the plate member 22 within a common plane defined by the plate member 22. In other words, the generally flat plate member 22 of the auxiliary closing wheel 20 defines a plane and the plurality of spiked teeth 26 is situated within the same plane. Stated still another way, the plurality of teeth 26 are co-planar with the plate member 22.

The plate member 22 defines a center aperture 28 that is configured to receive the same rod 14 by which a factory closing wheel 10 is coupled to a mounting arm 8 of the seeding implement. Therefore, an auxiliary closing wheel 20 may be coupled to the rod 14 and is configured to rotate as the rod 14 rotates relative to the mounting arm 8. As shown in the drawings, an auxiliary closing wheel 20 includes a diameter that is slightly larger than a diameter of a factory closing wheel 10. The plate member 22 of the auxiliary closing wheel 20 may be prevented from sliding off of the rod 14 by a second fastener 30 such as a nut threadably received onto the rod 14 (FIG. 2).

Figure 5A:
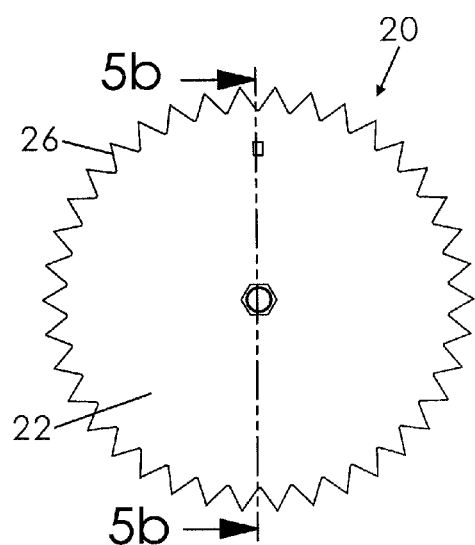
FIG. 5*a* is a front view of the auxiliary and factory closing wheels as in FIG. 2.
Figure 5B:
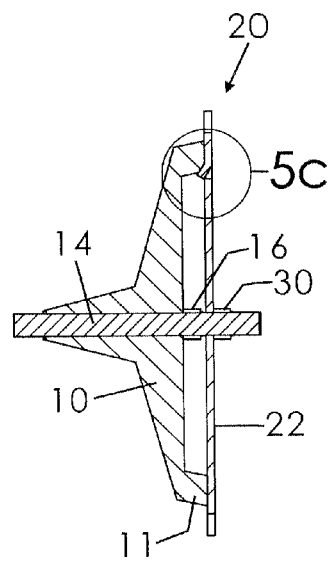
FIG. 5*b* is a sectional view taken along line 5*b*-5*b* of FIG. 5*a*.
Figure 5C:
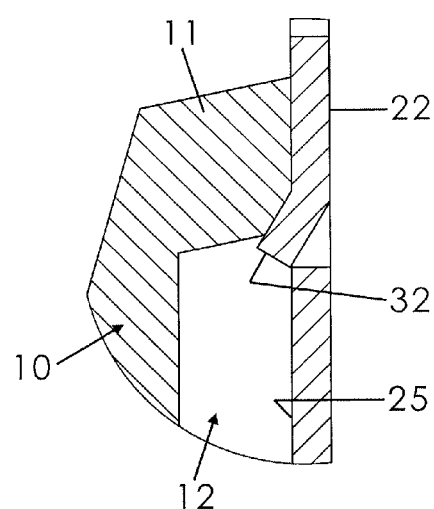
FIG. 5*c* is an isolated view on an enlarged scale taken from FIG. 5*b*.

When an auxiliary closing wheel 20 is mounted to the same mounting rod 14 as an associated factory closing wheel 10, an inner surface 25 of the auxiliary closing wheel plate member 22 is immediately adjacent or bearing against the outwardly extending wall 11 of the factory closing wheel 10 (FIG. 5c). An auxiliary closing wheel 20 is coupled to an associated factory closing wheel 10 when positioned on the same mounting rod 14 and first 16 and second 30 fasteners are engaged. In addition, the inner surface 25 of an auxiliary closing wheel 20 includes a flange 32 extending away from the inner surface thereof as shown in FIG. 3c. The flange 32 may be a bent tongue-like portion caused by punching a hole through the outside surface of the plate member 22. The flange 32 is positioned on the inner surface 25 of the plate member 22 so as to mate with the recessed area 12 of the factory closing wheel 10 (FIG. 5c). Specifically, the flange 32 bears against the wall 11 of the factory closing wheel 10 that defines the recess 12 in a friction fit relationship. It is understood that the outwardly extending wall 11 may be modified to include a notch 13 configured to more securely receive the flange 32 (FIG. 3). The mating of a factory closing wheel 10 and an auxiliary closing wheel 20 results in the wheels rotating in unison, i.e. rotate together in use.

In use, an auxiliary closing wheel 20 may be mounted to the same rod 14 that couples the factory closing wheel 10 to the mounting arm of a seeding implement. The plate member 22 of the auxiliary closing wheel 20 may be secured thereto with a second fastener 30 as described above. In addition, the flange 32 is configured and positioned to mate with the recessed area 12 of the factory closing wheel 10. Together, the combination of a factory closing wheel 10 and auxiliary closing wheel 20 provides a heavier closing wheel assembly that pushes the spiked teeth 26 through heavy soil/residue ground conditions common in no-till field situations. The combination assembly, however, also works well in conventional till conditions as the factory closing wheel 10 acts as a depth control as it rides atop the soil so as to not allow the spiked teeth 26 to penetrate too deeply. The extra weight of the combination also decreases the bouncing effect common with factory closing wheel only implements.

It is also contemplated that in some embodiments, the factory closing wheel 10 and auxiliary closing wheel 20 may be constructed as an integrated combination closing wheel assembly installed either as original equipment or as an aftermarket accessory.

It is understood that while certain forms of this invention have been illustrated and described, it is not limited thereto except insofar as such limitations are included in the following claims and allowable functional equivalents thereof.

The invention claimed is:

1. An auxiliary closing wheel for use with an agricultural seeding implement having at least one factory closing wheel coupled to a rod that is in turn rotatably coupled to a seeding implement mounting arm, the at least one factory closing wheel having a generally annular main plate and a wall extending outwardly from a peripheral edge of the annular main plate that defines a recessed area and defines a notch, said wall having a side surface perpendicular to the annular main plate that is situated to selectively contact a soil surface, said auxiliary closing wheel comprising:

a plate member that includes a generally planar and circular configuration having an annular peripheral edge adjacent the peripheral edge of the annular main plate of the at least one factory closing wheel;

wherein said plate member is selectively rotatably coupled to the rod on which the at least one factory closing wheel is rotatably mounted to the seeding implement mounting arm;

a plurality of spiked teeth extending outwardly from said annular peripheral edge of said plate member;

wherein:

said auxiliary closing wheel includes a diameter larger than a diameter of the at least one factory closing wheel;

said plurality of spiked teeth are coplanar with said plate member and include free ends, respectively, configured to penetrate a ground surface when said plate member is rotated, said free ends penetrating to a maximum depth when the side surface of the wall of the at least one factory closing wheel contacts the soil surface;

said plurality of spiked teeth are adjacent the side surface of the wall of the at least one factory closing wheel when said plate member is coupled to the rod.

said annular peripheral edge of said plate member is adjacent the annular peripheral edge of the at least one factory closing wheel when said plate member is coupled to the rod;

said plate member defines an aperture configured to receive the rod on which the at least one factory closing wheel is mounted, said plate member bearing against the wall of the at least one factory closing wheel when said plate member is coupled to the at least one factory closing wheel;

the at least one factory closing wheel is releasably coupled to the rod of the seeding implement mounting arm with a first fastener; and said auxiliary closing wheel is releasably coupled to the rod of the seeding implement mounting arm with a second fastener.

2. The auxiliary closing wheel as in claim 1, wherein said plate member includes an inner surface having a flange extending away therefrom, said flange configured to mate with the notch of the at least one factory closing wheel such that the at least one factory closing wheel and said plate member rotate in unison.

\* \* \* \* \*